(12) United States Patent
Vilardo et al.

(10) Patent No.: US 8,070,837 B2
(45) Date of Patent: Dec. 6, 2011

(54) USE OF FATTY ACID ALKOXYLATES AS A METHOD TO REMEDY ENGINE INTAKE VALVE STICKING

(75) Inventors: Jonathan S. Vilardo, Chardon, OH (US); Mark Davies, Belper (GB); Malcolm MacDuff, Quarndon (GB); Mitchell M. Jackson, Chagrin Falls, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 554 days.

(21) Appl. No.: 11/913,816

(22) PCT Filed: May 10, 2006

(86) PCT No.: PCT/US2006/018024
§ 371 (c)(1),
(2), (4) Date: Sep. 9, 2008

(87) PCT Pub. No.: WO2006/124438
PCT Pub. Date: Nov. 23, 2006

(65) Prior Publication Data
US 2009/0044445 A1   Feb. 19, 2009

Related U.S. Application Data

(60) Provisional application No. 60/680,933, filed on May 13, 2005.

(51) Int. Cl.
*C10L 1/18* (2006.01)
*C10L 1/22* (2006.01)
(52) U.S. Cl. ........... 44/403; 44/347; 44/405; 44/412; 44/415; 44/443
(58) Field of Classification Search ............ 44/403, 44/405, 443, 415, 347, 412
See application file for complete search history.

(56) References Cited

U.S. PATENT DOCUMENTS 2,950,272 A * 8/1960 Kirkpatrick ............... 530/232
3,658,495 A   4/1972 Dorer, Jr. et al.
5,679,116 A * 10/1997 Cunningham et al. ........ 44/359

FOREIGN PATENT DOCUMENTS

| EP | 0460957 | 12/1991 |
| EP | 0530094 | 3/1993 |
| EP | 0664331 | 7/1995 |
| WO | 93/20170 | 10/1993 |
| WO | 01/59035 | 8/2001 |
| WO | 02/22765 | 3/2002 |

OTHER PUBLICATIONS

Search Report for corresponding PCT Application No. PCT/US2006/018024 filed May 10, 2006.

* cited by examiner

*Primary Examiner* — Cephia D Toomer
(74) *Attorney, Agent, or Firm* — Christopher D. Hilker; David M. Shold

(57) ABSTRACT

The use of alkoxylates and nitrogen containing detergents in a fuel additive composition to prevent intake valve sticking and reduce intake valve deposits.

12 Claims, No Drawings

USE OF FATTY ACID ALKOXYLATES AS A METHOD TO REMEDY ENGINE INTAKE VALVE STICKING

BACKGROUND OF THE INVENTION

The present invention relates to a fuel composition containing a fatty acid alkoxylate and a nitrogen containing detergent as a method to remedy engine intake valve sticking.

Hydrocarbon fuels generally contain substances that tend to form deposits in the fuel delivery system of an internal combustion engine such as the fuel injectors in diesel engines and the intake valves in gasoline engines. These deposits, if allowed to build up, can significantly reduce engine performance in terms of drivability, power output, fuel economy and exhaust emissions. It is highly desirable to incorporate detergents into hydrocarbon fuels that are effective in controlling deposits by inhibiting their formation and facilitating their removal so that engine performance is maintained or improved.

However, it is also known that these detergent additives which remove carbonaceous engine deposits can actually cause intake valve sticking when they work up the intake valve stem.

U.S. Pat. No. 5,951,723, Eberhand, Sep. 14, 1999 discloses a method and fuel composition to prevent intake valve sticking, or to reduce or eliminate intake valve sticking comprising a fuel, an effective amount of a hydrocarbyl poly(oxyalkylene) aminocarbamate having at least one basic nitrogen atom and an average molecular weight of about 500 to about 10,000 and wherein the hydrocarbyl group has 1 to about 30 carbon atoms.

U.S. Pat. No. 6,210,452 B1, Su, Apr. 3, 2001 discloses fuel additives effective to control the formation of deposits in internal combustion engines, which comprise carboxylic acid alkoxylates suited for use with nitrogen containing fuel detergents.

International Publication WO 98/12282 A1 discloses a detergent additive composition for diesel fuel that contains a polyisobutylene monosuccinimide in an aromatic hydrocarbon diluent. The detergent additive composition can be used to remove or prevent engine deposits.

U.S. Pat. No. 6,749,651 B2, Carabell et al., Jun. 15, 2004 discloses that a combination of a specific Mannich condensation product, a hydrocarbyl-terminated poly(oxyalkylene) monol, and a carboxylic acid for use in a fuel composition can provide for the control of intake valve deposits.

The present invention, therefore, solves the problem of reducing the amount of deposit formation while reducing or eliminating the intake valve sticking by providing a new fuel composition and composition that can clean up deposits formed and prevent deposits from being formed on the valve stem, which will lead to intake valve stem sticking.

SUMMARY OF THE INVENTION

The present invention provides for a fuel additive composition suitable for use in an internal combustion engine, comprising:
  (a) a fuel which is liquid at room temperature;
  (b) a nitrogen containing detergent; and
  (c) an alkyloxylate
wherein said alkyloxylate comprises (i) a polyether containing two or more ester terminal groups; or (ii) a polyether containing one or more ester groups and one or more terminal ether groups; or (iii) a polyether containing one or more ester groups and one or more terminal amino groups;
wherein a terminal group is defined as a group located within five connecting carbon or oxygen atoms from the end of the polymer.

The present invention further provides a method for fueling an internal combustion engine, comprising:
  (a) supplying to said engine,
    (i) a fuel which is liquid at room temperature;
    (ii) a nitrogen containing detergent; and
    (iii) an alkyloxylate
wherein said alkyloxylate comprises (i) a polyether containing two or more ester terminal groups; or (ii) a polyether containing one or more ester groups and one or more terminal ether groups; or (iii) a polyether containing one or more ester groups and one or more terminal amino groups;
wherein a terminal group is defined as a group located within five connecting carbon or oxygen atoms from the end of the polymer.

The present invention additionally provides for an alkoxylate comprising,
  (i) a polyether containing two or more ester terminal groups;
  (ii) a polyether containing one or more ester groups and one or more terminal ether groups; or
  (iii) a polyether containing one or more ester groups and one or more terminal amino groups;
wherein a terminal group is defined as a group located within five connecting carbon or oxygen atoms from the end of the polymer.

The invention further provides for a fuel additive composition suitable for use in an internal combustion engine, comprising:
  (a) a fuel which is a liquid at room temperature;
  (b) a Mannich detergent; and
  (c) an alkyloxylate
wherein said alkyloxylate comprises (i) a polyether containing two or more ester terminal groups; or (ii) a polyether containing one or more ester groups and one or more terminal ether groups; or (iii) a polyether containing one or more ester groups and one or more terminal amino groups;
wherein a terminal group is defined as a group located within five connecting carbon or oxygen atoms from the end of the polymer.

DETAILED DESCRIPTION OF THE INVENTION

Various preferred features and embodiments will be described below by way of non-limiting illustration.

The fuel additive composition of the present invention useful for a spark or a compression ignition internal combustion engine comprises a hydrocarbon fuel, a nitrogen-containing detergent(s) and a fluidizer.

Fuel

The fuel composition of the present invention comprises a liquid fuel and is useful in fueling an internal combustion engine. The liquid fuel is normally a liquid at ambient conditions e.g., room temperature (20 to 30° C.). The liquid fuel can be a hydrocarbon fuel, a nonhydrocarbon fuel, or a mixture thereof. The hydrocarbon fuel can be a petroleum distillate to include a gasoline as defined by ASTM specification D4814 or a diesel fuel as defined by ASTM specification D975. In an embodiment of the invention the liquid fuel is a gasoline, and in other embodiments the liquid fuel is a leaded gasoline, or a nonleaded gasoline. In another embodiment of this invention the liquid fuel is a diesel fuel. The hydrocarbon fuel can be a hydrocarbon prepared by a gas to liquid process to include for example hydrocarbons prepared by a process such as the Fischer-Tropsch process. The nonhydrocarbon fuel can be an oxygen containing composition, often referred to as an oxygenate, to include an alcohol, an ether, a ketone, an ester of a carboxylic acid, a nitroalkane, or a mixture thereof. The nonhydrocarbon fuel can include for example methanol, ethanol, methyl t-butyl ether, methyl ethyl ketone, transesterified oils and/or fats from plants and animals such as rapeseed methyl ester and soybean methyl ester, and nitromethane. Mixtures of hydrocarbon and nonhydrocarbon fuels can include for example gasoline and methanol and/or ethanol, diesel fuel and ethanol, and diesel fuel and a transesterified plant oil such as rapeseed methyl ester. In an embodiment of the invention the liquid fuel is an emulsion of water in a hydrocarbon fuel, a nonhydrocarbon fuel, or a mixture thereof. In several embodiments of this invention the liquid fuel can have a sulphur content on a weight basis that is 5000 ppm or less, 1000 ppm or less, 300 ppm or less, 200 ppm or less, 30 ppm or less, or 10 ppm or less. The liquid fuel of the invention is present in a fuel composition in a major amount that is generally greater than 50 percent by weight, and in other embodiments is present at greater than 90 percent by weight, greater than 95% by weight, greater than 99.5% by weight, or greater than 99.8 percent by weight.

Detergent

The detergent of the present invention can be a Mannich detergent, sometimes referred to as a Mannich base detergent. Mannich detergent is a reaction product of a hydrocarbyl-substituted phenol, an aldehyde, and an amine or ammonia. The hydrocarbyl substituent of the hydrocarbyl-substituted phenol can have 10 to 400 carbon atoms, in another instance 30 to 180 carbon atoms, and in a further instance 10 or 40 to 110 carbon atoms. This hydrocarbyl substituent can be derived from an olefin or a polyolefin. Useful olefins include alpha-olefins, such as 1-decene, which are commercially available.

The polyolefins which can form the hydrocarbyl substituent can be prepared by polymerizing olefin monomers by well known polymerization methods and are also commercially available. The olefin monomers include monoolefins, including monoolefins having 2 to 10 carbon atoms such as ethylene, propylene, 1-butene, isobutylene, and 1-decene. An especially useful monoolefin source is a $C_4$ refinery stream having a 35 to 75 weight percent butene content and a 30 to 60 weight percent isobutene content. Useful olefin monomers also include diolefins such as isoprene and 1,3-butadiene. Olefin monomers can also include mixtures of two or more monoolefins, of two or more diolefins, or of one or more monoolefins and one or more diolefins. Useful polyolefins include polyisobutylenes having a number average molecular weight of 140 to 5000, in another instance of 400 to 2500, and in a further instance of 140 or 500 to 1500. The polyisobutylene can have a vinylidene double bond content of 5 to 69 percent, in a second instance of 50 to 69 percent, and in a third instance of 50 to 95 percent. The polyolefin can be a homopolymer prepared from a single olefin monomer or a copolymer prepared from a mixture of two or more olefin monomers. Also possible as the hydrocarbyl substituent source are mixtures of two or more homopolymers, two or more copolymers, or one or more homopolymers and one or more copolymers.

The hydrocarbyl-substituted phenol can be prepared by alkylating phenol with an olefin or polyolefin described above, such as a polyisobutylene or polypropylene, using well-known alkylation methods.

The aldehyde used to form the Mannich detergent can have 1 to 10 carbon atoms, and is generally formaldehyde or a reactive equivalent thereof such as formalin or paraformaldehyde.

The amine used to form the Mannich detergent can be a monoamine or a polyamine, including alkanolamines having one or more hydroxyl groups, as described in greater detail above. Useful amines include those described above, such as ethanolamine, diethanolamine, methylamine, dimethylamine, ethylenediamine, dimethylaminopropylamine, diethylenetriamine and 2-(2-aminoethylamino) ethanol. The Mannich detergent can be prepared by reacting a hydrocarbyl-substituted phenol, an aldehyde, and an amine as described in U.S. Pat. No. 5,697,988. In one embodiment of this invention the Mannich reaction product is prepared from an alkylphenol derived from a polyisobutylene, formaldehyde, and an amine that is a primary monoamine, a secondary monoamine, or an alkylenediamine, in particular, ethylenediamine or dimethylamine.

The Mannich reaction product of the present invention can be prepared by reacting the alkyl-substituted hydroxyaromatic compound, aldehyde and polyamine by well known methods including the method described in U.S. Pat. No. 5,876,468.

The Mannich reaction product can be prepared by well known methods generally involving reacting the hydrocarbyl substituted hydroxy aromatic compound, an aldehyde and amine at temperatures between 50 to 200° C. in the presence of a solvent or diluent while removing reaction water as described in U.S. Pat. No. 5,876,468.

Another type of detergent, which can be used in the present invention, is a succinimide. Succinimide detergents are well known in the field of lubricants and include primarily what are sometimes referred to as "ashless" detergents because they do not contain ash-forming metals and they do not normally contribute any ash forming metals when added to a lubricant. Succinimide detergents are the reaction product of a hydrocarbyl substituted succinic acylating agent and an amine containing at least one hydrogen attached to a nitrogen atom. The term "succinic acylating agent" refers to a hydrocarbon-substituted succinic acid or succinic acid-producing compound (which term also encompasses the acid itself). Such materials typically include hydrocarbyl-substituted succinic acids, anhydrides, esters (including half esters) and halides.

Succinic based detergents have a wide variety of chemical structures including typically structures such as

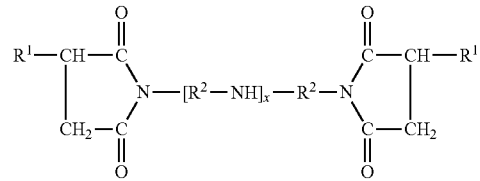

In the above structure, each $R^1$ is independently a hydrocarbyl group, which may be bound to multiple succinimide groups, typically a polyolefin-derived group having an $\overline{M}_n$ of 500 or 700 to 10,000. Typically the hydrocarbyl group is an alkyl group, frequently a polyisobutylene group with a molecular weight of 500 or 700 to 5000, or 1500 or 2000 to 5000. Alternatively expressed, the $R^1$ groups can contain 40 to 500 carbon atoms or at least 50 to 300 carbon atoms, e.g., aliphatic carbon atoms. The $R^2$ are alkylene groups, commonly ethylene ($C_2H_4$) groups. Such molecules are commonly derived from reaction of an alkenyl acylating agent with a polyamine, and a wide variety of linkages between the two moieties is possible beside the simple imide structure shown above, including a variety of amides and quaternary ammonium salts. Succinimide detergents are more fully described in U.S. Pat. Nos. 4,234,435, 3,172,892, and 6,165,235.

The polyalkenes from which the substituent groups are derived are typically homopolymers and interpolymers of polymerizable olefin monomers of 2 to 16 carbon atoms; usually 2 to 6 carbon atoms.

The olefin monomers from which the polyalkenes are derived are polymerizable olefin monomers characterized by the presence of one or more ethylenically unsaturated groups (i.e., $>C=C<$); that is, they are mono-olefinic monomers such as ethylene, propylene, 1-butene, isobutene, and 1-octene or polyolefinic monomers (usually diolefinic monomers) such as 1,3-butadiene, and isoprene. These olefin monomers are usually polymerizable terminal olefins; that is, olefins characterized by the presence in their structure of the group $>C=CH_2$. Relatively small amounts of non-hydrocarbon substituents can be included in the polyolefin, provided that such substituents do not substantially interfere with formation of the substituted succinic acid acylating agents.

Each $R^1$ group may contain one or more reactive groups, e.g., succinic groups, thus being represented (prior to reaction with the amine) by structures such as

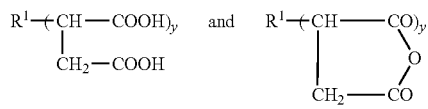

in which y represents the number of such succinic groups attached to the $R^1$ group. In one type of detergent, y=1. In another type of detergent, y is greater than 1, in one embodiment greater than 1.3 or greater than 1.4; and in another embodiment y is equal to or greater than 1.5. In one embodiment y is 1.4 to 3.5, such as 1.5 to 3.5 or 1.5 to 2.5. Fractional values of y, of course, can arise because different specific $R^1$ chains may be reacted with different numbers of succinic groups.

The amines which are reacted with the succinic acylating agents to form the carboxylic detergent composition can be monoamines or polyamines. In either case they will be characterized by the formula $R^4R^5NH$ wherein $R^4$ and $R^5$ are each independently hydrogen, hydrocarbon, amino-substituted hydrocarbon, hydroxy-substituted hydrocarbon, alkoxy-substituted hydrocarbon, amino, carbamyl, thiocarbamyl, guanyl, or acylimidoyl groups provided that no more than one of $R^4$ and $R^5$ is hydrogen. In all cases, therefore, they will be characterized by the presence within their structure of at least one H—N< group. Therefore, they have at least one primary (i.e., $H_2N$—) or secondary amino (i.e., H—N<) group. Examples of monoamines include ethylamine, diethylamine, n-butylamine, di-n-butylamine, allylamine, isobutylamine, cocoamine, stearylamine, laurylamine, methyllaurylamine, oleylamine, N-methyl-octylamine, dodecylamine, and octadecylamine.

The polyamines from which the detergent is derived include principally alkylene amines conforming, for the most part, to the formula

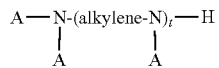

wherein t is an integer typically less than 10, A is hydrogen or a hydrocarbyl group typically having up to 30 carbon atoms, and the alkylene group is typically an alkylene group having less than 8 carbon atoms. The alkylene amines include principally, ethylene amines, hexylene amines, heptylene amines, octylene amines, other polymethylene amines. They are exemplified specifically by: ethylene diamine, diethylene triamine, triethylene tetramine, propylene diamine, decamethylene diamine, octamethylene diamine, di(heptamethylene) triamine, tripropylene tetramine, tetraethylene pentamine, trimethylene diamine, pentaethylene hexamine, di(-trimethylene) triamine. Higher homologues such as are obtained by condensing two or more of the above-illustrated alkylene amines likewise are useful. Tetraethylene pentamine is particularly useful.

The ethylene amines, also referred to as polyethylene polyamines, are especially useful. They are described in some detail under the heading "Ethylene Amines" in Encyclopedia of Chemical Technology, Kirk and Othmer, Vol. 5, pp. 898-905, Interscience Publishers, New York (1950).

Hydroxyalkyl-substituted alkylene amines, i.e., alkylene amines having one or more hydroxyalkyl substituents on the nitrogen atoms, likewise are useful. Examples of such amines include N-(2-hydroxyethyl)ethylene diamine, N,N'-bis(2-hydroxyethyl)-ethylene diamine, 1-(2-hydroxyethyl)piperazine, monohydroxypropyl)-piperazine, di-hydroxypropy-substituted tetraethylene pentamine, N-(3-hydroxypropyl)-tetra-methylene diamine, and 2-heptadecyl-1-(2-hydroxyethyl)-imidazoline.

Higher homologues, such as are obtained by condensation of the above-illustrated alkylene amines or hydroxy alkyl-substituted alkylene amines through amino radicals or through hydroxy radicals, are likewise useful. Condensed polyamines are formed by a condensation reaction between at least one hydroxy compound with at least one polyamine reactant containing at least one primary or secondary amino group and are described in U.S. Pat. No. 5,230,714 (Steckel).

The succinimide detergent is referred to as such since it normally contains nitrogen largely in the form of imide functionality, although it may be in the form of amine salts, amides, imidazolines as well as mixtures thereof. To prepare the succinimide detergent, one or more of the succinic acid-producing compounds and one or more of the amines are heated, typically with removal of water, optionally in the presence of a normally liquid, substantially inert organic liquid solvent/diluent at an elevated temperature, generally in the range of 80° C. up to the decomposition point of the mixture or the product; typically 100° C. to 300° C.

The succinic acylating agent and the amine (or organic hydroxy compound, or mixture thereof) are typically reacted in amounts sufficient to provide at least one-half equivalent, per equivalent of acid-producing compound, of the amine (or hydroxy compound, as the case may be). Generally, the maximum amount of amine present will be about 2 moles of amine per equivalent of succinic acylating agent. For the purposes of this invention, an equivalent of the amine is that amount of the amine corresponding to the total weight of amine divided by the total number of nitrogen atoms present. The number of equivalents of succinic acid-producing compound will vary with the number of succinic groups present therein, and generally, there are two equivalents of acylating reagent for each succinic group in the acylating reagents. Additional details and examples of the procedures for preparing the succinimide detergents of the present invention are included in, for example, U.S. Pat. Nos. 3,172,892; 3,219,666; 3,272,746; 4,234,435; 6,440,905 and 6,165,235.

Yet another type of detergent, which can be used in the present invention, can be a polyisobutylene amine. The amine use to make the polyisobutylene amine can be a polyamine such as ethylenediamine, 2-(2-aminoethylamino)-ethanol, or diethylenetriamine. The polyisobutylene amine of the present invention can be prepared by several known methods generally involving amination of a derivative of a polyolefin to include a chlorinated polyolefin, a hydroformylated polyolefin, and an epoxidized polyolefin. In one embodiment of the invention the polyisobutylene amine is prepared by chlorinating a polyolefin such as a polyisobutylene and then reacting the chlorinated polyolefin with an amine such as a polyamine at elevated temperatures of generally 100 to 150° C. as described in U.S. Pat. No. 5,407,453. To improve processing a solvent can be employed, an excess of the amine can be used to minimize cross-linking, and an inorganic base such as sodium carbonate can be used to aid in removal of hydrogen chloride generated by the reaction.

Yet another type of detergent, which can be used in the present invention, is a glyoxylate. A glyoxylate detergent is a fuel soluble ashless detergent which, in a first embodiment, is the reaction product of an amine having at least one basic nitrogen, i.e. one >N—H, and a hydrocarbyl substituted acylating agent resulting from the reaction, of a long chain hydrocarbon containing an olefinic bond with at least one carboxylic reactant selected from the group consisting of compounds of the formula (I)

$$(R^1C(O)(R^2)_nC(O))R^3 \qquad (I)$$

and compounds of the formula (II)

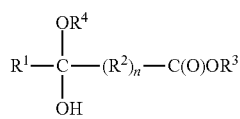

(II)

wherein each of $R^1$, $R^3$ and $R^4$ is independently H or a hydrocarbyl group, $R^2$ is a divalent hydrocarbylene group having 1 to 3 carbons and n is 0 or 1:

Examples of carboxylic reactants are glyoxylic acid, glyoxylic acid methyl ester methyl hemiacetal, and other omega-oxoalkanoic acids, keto alkanoic acids such as pyruvic acid, levulinic acid, ketovaleric acids, ketobutyric acids and numerous others. The skilled worker having the disclosure before him will readily recognize the appropriate compound of formula (I) to employ as a reactant to generate a given intermediate.

The hydrocarbyl substituted acylating agent can be the reaction of a long chain hydrocarbon containing an olefin and the above described carboxylic reactant of formula (I) and (II), further carried out in the presence of at least one aldehyde or ketone. Typically, the aldehyde or ketone contains from 1 to about 12 carbon atoms. Suitable aldehydes include formaldehyde, acetaldehyde, propionaldehyde, butyraldehyde, isobutyraldehyde, pentanal, hexanal, heptaldehyde, octanal, benzaldehyde, and higher aldehydes. Other aldehydes, such as dialdehydes, especially glyoxal, are useful, although monoaldehydes are generally preferred. Suitable ketones include acetone, butanone, methyl ethyl ketone, and other ketones. Typically, one of the hydrocarbyl groups of the ketone is methyl. Mixtures of two or more aldehydes and/or ketones are also useful.

Compounds and the processes for making these compounds are disclosed in U.S. Pat. Nos. 5,696,060; 5,696,067; 5,739,356; 5,777,142; 5,856,524; 5,786,490; 6,020,500; 6,114,547; 5,840,920 and are incorporated herein by reference.

In another embodiment, the glyoxylate detergent is the reaction product of an amine having at least one basic nitrogen, i.e. one >N—H, and a hydrocarbyl substituted acylating agent resulting from the condensation product of a hydroxyaromatic compound and at least one carboxylic reactant selected from the group consisting of the above described compounds of the formula (I) and compounds of the formula (II). Examples of carboxylic reactants are glyoxylic acid, glyoxylic acid methyl ester methyl hemiacetal, and other such materials as listed above.

The hydroxyaromatic compounds typically contain directly at least one hydrocarbyl group R bonded to at least one aromatic group. The hydrocarbyl group R may contain up to about 750 carbon atoms or 4 to 750 carbon atoms, or 4 to 400 carbon atoms or 4 to 100 carbon atoms. In one embodiment, at least one R is derived from polybutene. In another embodiment, R is derived from polypropylene.

In another embodiment, the reaction of the hydroxyaromatic compound and the above described carboxylic acid reactant of formula (I) or (II) can be carried out in the presence of at least one aldehyde or ketone. The aldehyde or ketone reactant employed in this embodiment is a carbonyl compound other than a carboxy-substituted carbonyl compound. Suitable aldehydes include monoaldehydes such as formaldehyde, acetaldehyde, propionaldehyde, butyraldehyde, isobutyraldehyde, pentanal, hexanal, heptaldehyde, octanal, benzaldehyde, and higher aldehydes. Other aldehydes, such as dialdehydes, especially glyoxal, are useful. Suitable ketones include acetone, butanone, methyl ethyl ketone, and other ketones. Typically, one of the hydrocarbyl groups of the ketone is methyl. Mixtures of two or more aldehydes and/or ketones are also useful.

Compounds and the processes for making these compounds are disclosed in U.S. Pat. Nos. 3,954,808; 5,336,278; 5,620,949 and 5,458,793 and are incorporated herein by reference The detergent additive of this invention can be present in a mixture of various detergents referenced above.

The detergent additive of this invention can be present in a fuel composition on a weight basis at 1 to 10,000 ppm (parts per million), and in other embodiments can be present at 10 to 1,000 ppm, at 20 to 600 ppm, or at 30 to 300 ppm.

Alkoxylate

The fluidizer of the present invention comprises an alkoxylate. The alkyloxylate can be a (i) a polyether containing two or more ester terminal groups; or (ii) a polyether containing one or more ester groups and one or more terminal ether groups; or (iii) a polyether containing one or more ester groups and one or more terminal amino groups;

wherein a terminal group is defined as a group located within five connecting carbon or oxygen atoms from the end of the polymer. Connecting is defined as the sum of the connecting carbon and oxygen atoms in the polymer or end group.

The alkoxylate of the present invention can be represented by the formula

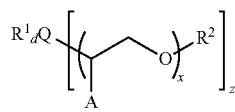

wherein, $R^1$ is H, TC(O)—, or a $C_{1-36}$ hydrocarbyl group, wherein T is a $C_{1-36}$ fatty acid hydrocarbyl mixture in tallow fatty acid or a fatty acid free of rosin acid; $R^2$ is H, —$(CH_2)_3$ $NH_2$, WC(O)—, or mixtures thereof, wherein W is a $C_{1-36}$ hydrocarbyl group; A is H, —$CH_3$, —$CH_2CH_3$ or mixtures thereof; X is an integer from 1 to 36; Z is an integer 1 to 3; Q can be O or N; provided that if Q is N then d can be an integer from 0 to 2 and Z is the integer 3-d; if Q is O then d can be an integer 0 to 1 and Z is the integer 2-d and if Q is O and $R^1$ is $C_{1-36}$ hydrocarbyl group then $R^2$ is WC(O)—.

Examples of the alkoxylate can include: $C_{12-15}$ alcohol initiated polypropyleneoxide (22-24) ether amine, Bayer ACTACLEAR ND21-ATM ($C_{12-15}$ alcohol initiated polypropyleneoxide (22-24) ether-ol), tall oil fatty acid initiated polypropyleneoxide (22-24) ester-ol, butanol initiated polypropyleneoxide (23-25) ether-tallow fatty acid ester, glycerol dioleate initiated polypropyleneoxide (23-25) ether-ol, propylene glycol initiated polypropyleneoxide (33-34) ether tallow fatty acid ester, tallow fatty acid initiated polypropyleneoxide (22-24) ester-ol and $C_{12-15}$ alcohol initiated polypropyleneoxide (22-24) ether tallow fatty acid ester.

These alkoxylates can be made from the reaction of a fatty acid such as tall oil fatty acids (TOFA) that is, the mixture of fatty acids predominately oleic and linoleic and contains residual rosin acids or tallow acid that is, the mixture of fatty acids predominately stearic, palmitic and oleic with an alcohol terminated polyether such as polypropylene glycol in the presence of an acidic catalyst, usually methane sulphonic acid. These alkoxylates can also be made from the reaction of glycerol dioleate and propylene oxide in the presence of catalyst.

Preparative Example 1

$C_{12-15}$ Alcohol Initiated Polypropyleneoxide (22-24) Ether Tallow Fatty Acid Ester A 1000 ml flange flask is charged with $C_{12-15}$ alcohol initiated polypropyleneoxide (22-24) ether-ol, tallow acid, toluene and HSOM. The flask is equipped with a lid and clip, stirrer and stirrer guide, motor, nitrogen inlet, thermocouple and dean and stark trap with a condenser attached. The contents are stirred with a nitrogen blanket. The mixture is heated to 105° C. and held for one hour. The temperature is then increased to 154° C. and held for five hours where water and toluene are collected in the dean and stark trap. After five hours a sample was taken for DAN titration. Once the DAN titration value is less 4 the mixture was stripped under full vacuum to remove any residual toluene and then cooled and filtered through FAX5. The product is a $C_{12-15}$ alcohol initiated polypropyleneoxide (22-24) ether tallow fatty acid ester.

Preparative Example 2

Propylene Glycol Initiated Polypropyleneoxide (33-34) Ether Tallow Fatty Acid Ester A 1000 ml flange flask is charged with the propylene glycol initiated polypropyleneoxide (33-34) ether-diol, tallow acid, toluene and HSOM. The flask was equipped with a lid and clip, stirrer and stirrer guide, motor, nitrogen inlet, thermocouple and dean and stark trap with a condenser attached. The contents are stirred with a nitrogen blanket. The mixture is heated to 130° C. and held for 1 hour. The temperature set point is then increased to 154° C. and held for 5 hours where water and toluene are collected in the dean and stark trap. After five hours a sample was taken for DAN titration. Once the DAN titration value is less 4 the mixture was stripped under full vacuum to remove any residual toluene and then cooled and decanted. The product is a propylene glycol initiated polypropyleneoxide (33-34) ether tallow fatty acid ester.

Preparative Example 3

Butanol Initiated Polypropyleneoxide (23-25) Ether-Fatty Fatty Acid Ester

A 1000 ml flange flask is charged with butanol initiated polypropyleneoxide (23-25) ether-ol, tallow acid, toluene and HSOM. The flask is equipped with a lid and clip, stirrer and stirrer guide, motor, nitrogen inlet, thermocouple and dean and stark trap with a condenser attached. The contents are stirred with a nitrogen blanket. The mixture is heated to 130° C. and held for 1 hour. The temperature set point is then increased to 154° C. and held for 2 hours where water and toluene are collected in the dean and stark trap. The reaction is cooled over night and reheated to 154° C. and held for a further 5 hours. A sample is taken for DAN titration and once the DAN titration value is less 4 the mixture is stripped under full vacuum to remove any residual toluene and then cooled and decanted. The product is a butanol initiated polypropyleneoxide (23-25) ether-tallow fatty acid ester Preparative Example 4

Glycerol Dioleate Initiated Polypropyleneoxide (23-25) Ether-ol

Glycerol dioleate and KOH are mixed and vacuum striped in an rotary evaporator at 120° C. in order to form the potassium salt and remove trace water. The potassium salt is transferred to a high pressure autoclave bomb and reacted with three 8 mole increments of propylene oxide. At the end of the reaction the vessel is cooled and an FTIR was recorded to ensure complete reaction of propylene oxide. The material was transferred to a florintine flask and magnesol, water and FAX 5 are added. The material is heated on a rotary evaporator for 2 hours before filtering through FAX 5 to yield the glycerol dioleate initiated polypropyleneoxide (23-25) ether-ol.

The fluidizer of this invention can be present in a fuel composition at a weight ratio of the fluidizer to the nitrogen-containing detergent or detergent mixture from 0.1:10 to 10:0.1 based on weight polymeric actives, in another embodiment 0.25:10 to 10:0.25, in yet another embodiment 0.5:10 to 10:0.5.

Additional Performance Additives and Concentrates and Fuel Compositions

The fuel composition of the present invention can further comprise one or more additional performance additives. Additional performance additives can be added to a fuel composition depending on several factors to include the type of internal combustion engine and the type of fuel being used in that engine, the quality of the fuel, and the service conditions under which the engine is being operated. The additional performance additives can include an antioxidant such as a hindered phenol or derivative thereof and/or a diarylamine or derivative thereof, a corrosion inhibitor such as an alkenylsuccinic acid, a supplemental detergent/dispersant additive such as a polyetheramine, a cold flow improver such as an esterified copolymer of maleic anhydride and styrene and/or a copolymer of ethylene and vinyl acetate, a foam inhibitor such as a silicone fluid, a demulsifier such as a polyalkoxylated alcohol, a lubricity agent such as a fatty carboxylic acid, a metal deactivator such as an aromatic triazole or derivative thereof, a valve seat recession additive such as an alkali metal sulfosuccinate salt, a biocide, an antistatic agent, a deicer, a fluidizer such as a mineral oil and/or a poly(alpha-olefin) and/or a polyether, and a combustion improver such as an octane or cetane improver. The additional performance additives can each be added directly to a fuel composition, but they are generally added together in an additive concentrate composition to a fuel composition. The additive concentrate composition can comprise a solvent and the detergent/dispersant additive, and in another embodiment can further comprise one or more additional performance additives. The solvent can be an aliphatic hydrocarbon, an aromatic hydrocarbon, an oxygen containing composition, or a mixture thereof. The oxygen containing composition can include an alcohol, a ketone, an ester of a carboxylic acid, a glycol and/or a polyglycol, or a mixture thereof. The solvent in an embodiment of the invention will be substantially free of to free of sulphur having a sulphur content in several instances that is below 25 ppm, below 18 ppm, below 10 ppm, below 8 ppp, below 4 ppm, or below 2 ppm. The solvent can be present in the additive concentrate composition at 1 to 99 percent by weight, and in other instances at 3 to 80 percent by weight, or 10 to 70 percent by weight. The detergent/dispersant additive and additional performance additives taken separately or in combination can be present in the additive concentrate composition at 0.01 to 95 percent by weight, and in other instances can be present at 0.01 to 90 percent by weight, at 0.01 to 85 percent by weight, or at 0.1 to 80 percent by weight. In an embodiment of the invention the solvent of the additive concentrate composition can include the medium substantially free of to free of sulphur as described in this application. In an embodiment of the invention the fuel composition is substantially free of or free of at least one member selected from the group consisting of sulphur, phosphorus, sulfated ash, and combinations thereof, and in other embodiments the fuel composition contains less than 20 ppm, less than 15 ppm, less than 10 ppm, or less than 1 ppm of one of these members. In an embodiment of the invention the additive concentrate composition or fuel composition can be prepared by admixing or mixing the components of the composition at ambient to elevated temperatures usually up to 60° C. until the composition is homogeneous.

Industrial Application

In one embodiment the invention is useful for a liquid fuel or for an internal combustion engine. The internal combustion engine includes a 2-stroke or 4-stroke engine fuelled with gasoline, diesel, a natural gas or a mixed gasoline/alcohol. The diesel engine includes both light duty and heavy duty diesel engines. The gasoline engine includes a direct injection gasoline engine.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

Examples

The invention will be further illustrated by the following examples, which set forth particularly advantageous embodiments. While the examples are provided to illustrate the present invention, they are not intended to limit it.

The fluidizers are evaluated in the General Motors 5.0 L valve sticking test, which uses a 1988 5.0 L displacement V-8 CHEVROLET™ truck with a 8.2:1 compression, throttle body injection engine and outfitted with a chassis dynamometer. Before the test begins the vehicle's intake valves are cleaned and 160 ppm of a fluidizer and 410 ppm of a Mannich detergent are mixed in a 85 octane regular unleaded gasoline blended with 10.2% (vol/vol) ethanol and this mixture is supplied to the truck. The truck performs four driving cycles, (each driving cycle is for 87 kilometers (54 miles) at 89 kilometers per hour (55 miles per hours) on a track) for a total of 346 kilometers (215 miles). After the last driving cycle is completed the vehicle is cold-soaked at −20° C. (−4° F.) for 16 hours. Following the cold-soak, a compression test is performed at the cold conditions. No or very low compression pressures from the compression tests indicate valve sticking. This test procedure is performed a total of three times over a three day period (i.e., one test per day). The fluidizer passes the test only if no stuck valves are reported during the three day testing period.

The fluidizers used in this test include three available fluidizers: $C_{12-15}$ alcohol initiated polypropyleneoxide (22-24) ether amine (Reference Example 1) and $C_{12-15}$ alcohol initiated polypropyleneoxide (22-24) ether-ol (Reference Example 2) and tall oil fatty acid initiated polypropyleneoxide (22-24) ester-ol (Reference Example 3); and six experimental fluidizers: butanol initiated polypropyleneoxide (23-25) ether-tallow fatty acid ester (Fluidizer 1); glycerol dioleate initiated polypropyleneoxide (23-25) ether-ol (Fluidizer 2); propylene glycol initiated polypropyleneoxide (33-34) ether tallow fatty acid (stabilized) ester (Fluidizer 3a), tallow fatty acid initiated polypropyleneoxide (22-24) ester-ol (Fluidizer 4), propylene glycol initiated polypropyleneoxide (33-34) ether tallow fatty acid (non-stabilized) ester (Fluidizer 3b) and $C_{12-15}$ alcohol initiated polypropyleneoxide (22-24) ether tallow fatty acid ester (Fluidizer 5).

The results of the test show that Fluidizers 1, 2, 3a and 4 of the present invention and two reference examples (i.e., Reference Example 1 and 2) all pass the test (i.e., no stuck valves). Fluidizers 3b and 5 and Reference Example 3 were not run in this test. Thus, Fluidizer 1, 2, 3a and 4 of the present invention provides equivalent protection from stuck valves compared to Reference Example 1 and 2.

The fluidizers of the present invention are further evaluated in the modified ASTM D5500 Driving Cycle test. The vehicles used in this test are BMW™ 318i automobiles with 1.8 L 4 cycle engines. The fuel used is a regular unleaded subgrade 85 octane with 10% ethanol. The intake valves are BMW™ intake valve model number 11-34-1-254-625. The additive package used in the fuel consists of a 66 percent by weight of a Mannich type detergent (e.g. contains 25 percent by weight of diluent) and 33 percent by weight of the fluidizer (e.g. contains 0 percent by weight of diluent).

TABLE 1

| Type of Fluidizer | Fluidizer used (ppm) | Intake Valve Deposit (mg) |
|---|---|---|
| Reference Example 1 | 32.5 | 55.8 |
| Reference Example 1 | 40.1 | 47.4 |
| Reference Example 1 | 46.1 | 3.8 |
| Reference Example 3 | 32.5 | 81.9 |
| Reference Example 3 | 40.1 | 75.2 |
| Reference Example 3 | 46.1 | 30.3 |
| Fluidizer 4 | 40.1 | 16.7 |
| Fluidizer 4 | 46.1 | 6.5 |

Note:
The Reference Examples and Fluidizers in Table 1 are tested in car A with fuel batch A.

TABLE 2

| Type of Fluidizer | Fluidizer used (ppm) | Intake Valve Deposit (mg) |
|---|---|---|
| None | None | 131.4 |
| Reference Example 1 | 48.1 | 12.3 |
| Reference Example 2 | 48.1 | 6.1 |
| Fluidizer 1 | 48.1 | 18.6 |
| Fluidizer 3a | 48.1 | 4.5 |
| Fluidizer 4 | 48.1 | 14.5 |
| Fluidizer 3b | 48.1 | 17.2 |
| Fluidizer 5 | 48.1 | 7.8 |

Note:
The Reference Example and Fluidizers in Table 2 are tested in car B with fuel batch B.

TABLE 3

| Type of Fluidizer | Fluidizer used (ppm) | Intake Valve Deposit (mg) |
|---|---|---|
| Reference Example 1 | 35.2 | 30.2 |
| Reference Example 2 | 35.2 | 17.1 |
| Fluidizer 2 | 35.2 | 27.4 |
| Fluidizer 4 | 35.2 | 13.3 |

Note:
The Reference Example and Fluidizers in Table 3 are tested in car B with fuel batch C.

The results from Table 1-3 indicate that the Fluidizers of the present invention provide equivalent or superior protection from intake valve deposit formation compared to the Reference Example. It is worth noting that there exist variables in the aforementioned test, which can produce differences in the data. Thus, results which differ by 15 mg or less can be considered to be equivalent. The variables which can affect the results of the amount of intake valve deposit include weather, operator driving the vehicle, variation in engine build of the vehicle, and fuel batch.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What we claim:

1. A fuel additive composition comprising,
   (a) a fuel which is liquid at room temperature;
   (b) a nitrogen containing detergent; and
   (c) an alkyloxylate wherein said alkyloxylate comprises a compound represented by the formula:

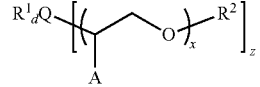

wherein $R^1$ is TC(O)— wherein T is a hydrocarbyl derived from tallow fatty acid; $R^2$ is H, WC(O)—, or mixtures thereof wherein W is a $C_{1-36}$ hydrocarbyl group; A is H, —$CH_3$, —$CH_2CH_3$ or mixtures thereof; X is an integer from 1 to 36; Z is an integer 1 to 3; Q is O; d is an integer 0 to 1 and Z is the integer 2-d.

2. The fuel additive composition of claim 1 wherein the weight ratio on an active basis of component (b) to component (c) is 1:10 to 10:0.52.

3. The fuel additive composition of claim 1, wherein the nitrogen containing detergent is succinimide, polyisobutylene amine, Mannich, or mixtures thereof.

4. The fuel composition of claim 1, wherein the nitrogen containing detergent is Mannich.

5. The fuel additive composition of claim 1, wherein (b) and (c) are present in an amount of about 10 ppm to about 10000 ppm.

6. A method of fueling an internal combustion engine comprising:
   (a) supplying to said engine,
      (i) a fuel which is a liquid at room temperature;
      (ii) a nitrogen containing detergent; and
      (iii) an alkyloxylate wherein said alkyloxylate comprises a compound represented by the formula:

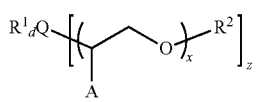

wherein $R^1$ is TC(O)— wherein T is a hydrocarbyl derived from tallow fatty acid; $R^2$ is H, WC(O)—, or mixtures thereof, wherein W is a $C_{1-36}$ hydrocarbyl group; A is H, —$CH_3$, —$CH_2CH_3$ or mixtures thereof; X is an integer from 1 to 36; Z is an integer 1 to 3; Q is O; d is an integer 0 to 1 and Z is the integer 2-d.

7. A fuel additive composition comprising,
(a) a fuel which is a liquid at room temperature;
(b) a Mannich detergent; and
(c) an alkyloxylate wherein said alkyloxylate comprises (i) tallow fatty acid initiated polypropyleneoxide ester-ols, (ii) propylene glycol initiated polypropyleneoxide ether tallow fatty acid esters, or (iii) combinations thereof.

8. A method of fueling an internal combustion engine comprising:
(a) supplying to said engine,
  (i) a fuel which is a liquid at room temperature;
  (ii) a nitrogen containing detergent; and
  (iii) an alkyloxylate wherein said alkyloxylate comprises tallow fatty acid initiated polypropyleneoxide ester-ols, propylene glycol initiated polypropyleneoxide ether tallow fatty acid esters, or combinations thereof.

9. The method of claim 6 wherein the weight ratio on an active basis of component (ii) to component (iii) is 1:10 to 10:0.52.

10. The method of claim 6 wherein the nitrogen containing detergent is succinimide, polyisobutylene amine, Mannich, or mixtures thereof.

11. The method of claim 6 wherein the nitrogen containing detergent is Mannich.

12. The method of claim 6 wherein (ii) and (iii) are present in an amount of about 10 ppm to about 10000 ppm.

* * * * *